(12) United States Patent
Izumi

(10) Patent No.: US 6,283,045 B1
(45) Date of Patent: Sep. 4, 2001

(54) FOLDABLE TABLE

(75) Inventor: Satoshi Izumi, Tokyo (JP)

(73) Assignee: On Way Co., Ltd., Tokyo (JP)

( * ) Notice: Subject to any disclaimer, the term of this patent is extended or adjusted under 35 U.S.C. 154(b) by 0 days.

(21) Appl. No.: 09/490,704

(22) Filed: Jan. 24, 2000

(51) Int. Cl.[7] ...................................................... A47B 3/00
(52) U.S. Cl. .......................... 108/115; 108/67; 108/157.1; 403/233
(58) Field of Search ................................ 108/115, 157.18, 108/157.1, 159.11, 159.12, 158.13, 158.12, 158.11, 67, 118, 119; 248/188, 188.1; 403/403, 205, 233, 234

(56) References Cited

U.S. PATENT DOCUMENTS

| | | | |
|---|---|---|---|
| 3,884,159 | * 5/1975 | Faria | 108/67 X |
| 4,026,219 | * 5/1977 | Shupe et al. | 108/67 X |
| 4,101,183 | * 7/1978 | McManus | 108/119 X |
| 4,917,341 | * 4/1990 | Pirchio | 108/118 X |
| 5,992,333 | * 11/1999 | Lai | 108/157.1 X |
| 6,026,751 | * 2/2000 | Tsai | 108/115 X |
| 6,073,894 | * 6/2000 | Chen | 108/115 X |
| 6,079,338 | * 6/2000 | Yeh | 108/115 |
| 6,125,769 | * 10/2000 | Tsai et al. | 108/67 X |

* cited by examiner

Primary Examiner—José V. Chen
(74) Attorney, Agent, or Firm—Helfgott & Karas, P.C.

(57) ABSTRACT

A tabletop has a plurality of panels connected by rope-type connections and pole-shaped legs that can be folded up by way of links. Bars with grooves are provided to maintain the tabletop panels in an outstretched position. Connectors provided on the legs and connectors provided on the panels both engage the grooves on the bars such that the legs are properly positioned with respect to the panels of the tabletop.

14 Claims, 7 Drawing Sheets

FOLDABLE TABLE

BACKGROUND OF THE INVENTION

1. Field of the Invention

This invention relates to a foldable table whose legs and tabletop can be removed or installed freely.

2. Description of the Prior Art

Conventionally, it has been desired that tables used for outdoor activities or outdoor work be compact for easy storage, lightweight, so that they can be conveniently carried, and be easy to assemble. So, there are tables which have been constructed such that the legs and tabletop can be separated and that the separated legs or tabletop can be folded. There is technology where the removable tabletop is constructed with several panels that are connected together with a rope-type connection such that it could be freely folded, where bars are installed underneath the tabletop to keep it flat, and where the legs are installed to those bars.

However, there is the problem that to assemble the separated legs and tabletop required much time and work, so that a table that could be easily assembled is desired.

For example, in Japanese Patent Disclosure Tokukai 11ci 11-19639, there is a table having a tabletop that can be folded by way of a rope-type connection, including support bars for securing the tabletop so that it is flat, and foldable legs, and where there is a connection means on both the tabletop and legs, the connection means having arc-shaped elastic support pieces that are more than semi-circular in which the support bars can be inserted, such that the table can be erected by arranging the support bars. Moreover, protruding sections are formed on the tabletop and legs such that they can be inserted into holes that are formed in the support bars.

However, with the table described above, the support bars are formed in a cylindrical shape, and since there are insertion holes on the bars, the tabletop and legs must be installed in a direction corresponding to the holes, and this causes the problem to require time to position the support bars, which makes assembly very troublesome.

In addition, in order for the table of the prior art to have foldable legs, the four cylindrical legs are constructed such that adjacent legs are connected with each other by links. Since the end of the links are formed such that they slide and move with respect to cylindrical legs, there was the problem that the tabletop would rock even if the four links that formed to make a rectangle in a plane are deformed into a parellelogram shape.

SUMMARY OF THE INVENTION

The first objective of this invention is to provide a table that can be erected easily and which will do away with the troublesome work of both assembling the tabletop and bars, and assembling the bars and legs.

The second objective of this invention is to provide a table that has minimum rocking.

DESCRIPTION OF THE PREFERRED EMBODIMENTS

The table of this invention is a foldable table comprising a tabletop, square pole-shaped bars with grooves formed thereon, and a leg structure.

The tabletop has first connectors which are attached to one surface of the tabletop.

The leg structure has second connectors which are attached to the top end of each of the legs of the leg structure. The first and second connectors comprise a base having a installation means, and two elastic support pieces that extend from the base such that both of the elastic support pieces are bent in such a way that the tips face each other and such that they can fit together in the corresponding one of the grooves formed on the bars.

In one form of the foldable table of this invention, there are two such bars, and the aforementioned tabletop comprises several panels that are connected together with a rope-type method of connection such that the tabletop can fold freely, and the aforementioned leg structure comprises four square pole shaped legs that are linked together such that can be folded.

Two grooves are formed on the bars with a space between them that matches the spacing between the first connectors that are installed on the rear surface of the panels on both ends of the tabletop, and two grooves are formed on the bars with a space between them that matches the spacing between the second connectors on the top ends of the legs.

It is also possible for the grooves on the bars to be a hollow space between two protruding sections.

Figure 1:
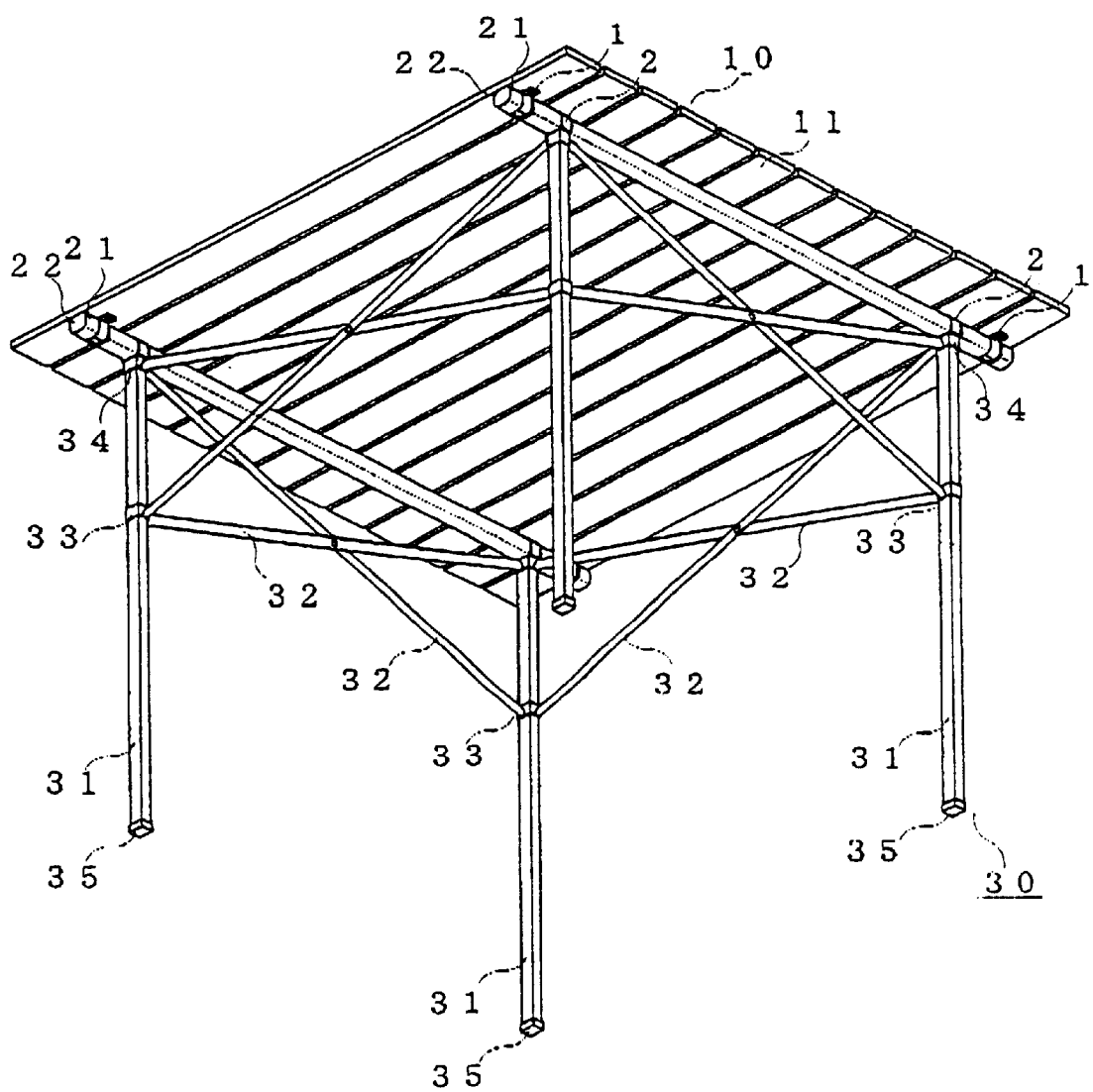
FIG. 1 is a perspective view of an embodiment of the table of this invention as seen from below.
Figure 2:
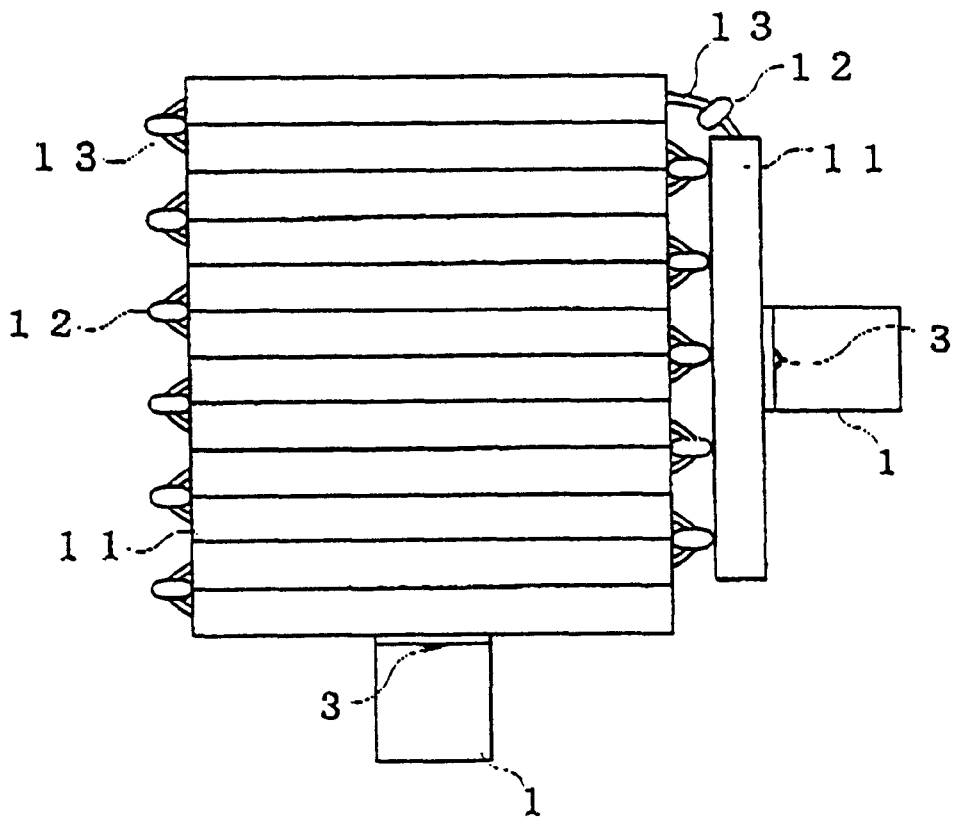
FIG. 2 is a side elevational view of the folded tabletop.
Figure 3:
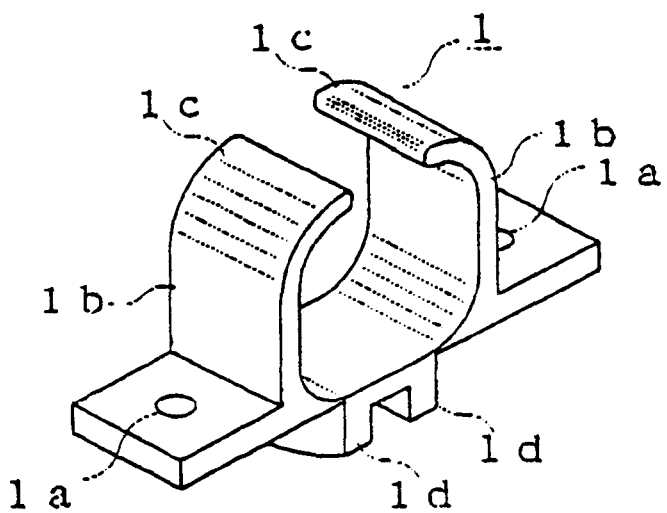
FIG. 3 is a perspective view of the connector.
Figure 4:
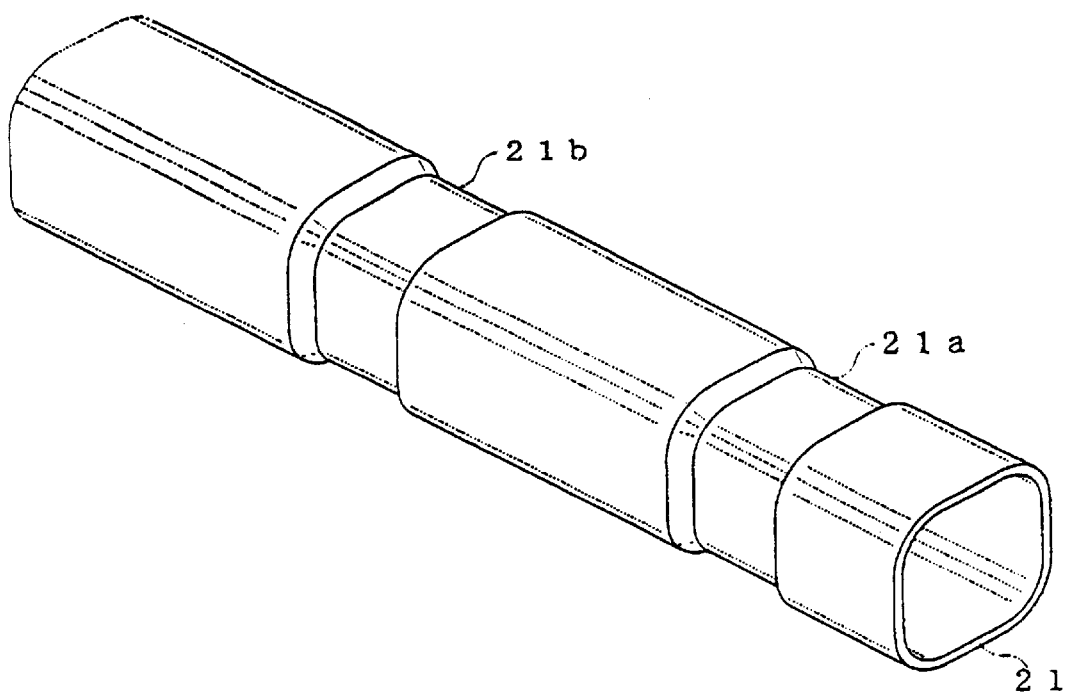
FIG. 4 is an enlarged perspective view of part of a bar.
Figure 5:
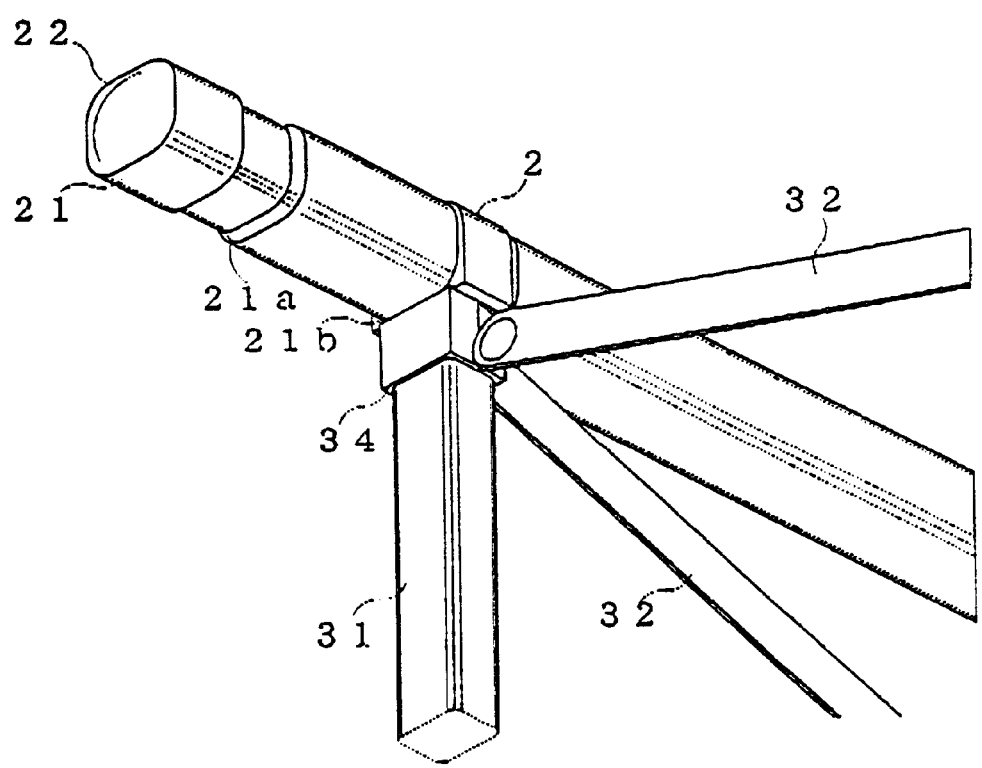
FIG. 5 is an enlarged perspective view of a bar connected to the leg structure as seen from below.
Figure 6:
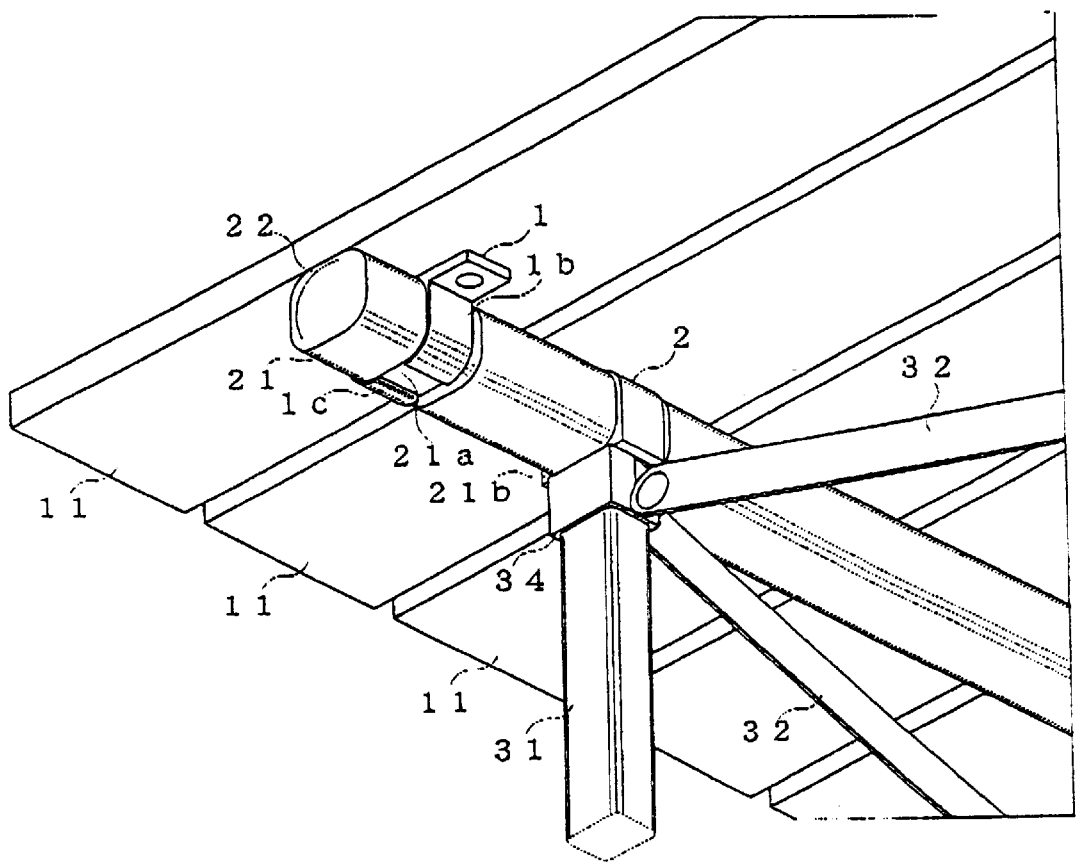
FIG. 6 is a perspective view of the installed tabletop as seen from below.

The preferred embodiment of the present invention will be explained based on the drawings. FIG. 1 is a perspective view of an embodiment of the table of this invention as seen from below. FIGS. 2 thru 4 are enlarged view of each of the components. FIG. 5 and FIG. 6 are enlarged partial views that show the method of assembly.

The table of this invention comprises a tabletop 10, two bars 21 and a leg structure 30.

As shown in side view of the folded tabletop of FIG. 2, the tabletop comprises a plurality of panels 11 (13 panels in the example shown in the figure) that are linked together by a rope-type connection method 13 such that the tabletop can be freely folded, and there are two connectors 1 located on the rear surface of the panels 11 at either end. The panels 11 has a flat surface and can be made of aluminum, wood, plastic or the like. In the case that they are made of aluminum, they are tubular, and the center is hollow in order to reduce the weight. Spacers 12 are placed between the panels 11 and the rope connection means 13 extends through them. With the spacers 12, there is no contact between panels 11 when the tabletop 10 is open as shown in FIG. 1, thus improving durability and handling. The connectors 1 are attached to the panels 11 with rivets 3, however, they can also be attached with other known technology.

As shown in the pictorial view of FIG. 3, the aforementioned connectors 1 have through holes 1a formed in them for installation, and there are two elastic support pieces 1b that are bent such that tips 1c face each other. The connectors 1 may be made of plastic or metal. The connectors 1 are attached with rivets or screws that are passed through the through holes 1a, and, as shown in the figure, there are legs 1d that are formed on the bottom. The panels 11 to which the connectors 1 are attached have holes for the legs 1d to fit into, so that positioning the connectors 1 becomes easy.

The leg structure 30 is assembled such that the square pole-shaped legs 31 can fold together by links 32, and at the top end of each of the legs 31 there is a connector 2 The legs 31 and links 32 is made of aluminum for lightweight, but can be made of wood or steal.

The connector 2 comprises a base section which has a square hole in which a leg 31 is inserted and secured, and to which links 32 are attached such that they can rotated freely (see FIG. 5), and two elastic support pieces have tips that are bent in a direction such that the tips face each other. The connection between the connector 2 and bar 21 is the same as the aforementioned connection with the connector 1. The connectors 2 can be made of plastic or metal.

Attached to one end of the links 32 a fastener 34 which is fastened to one end of the leg 31, and attached to the other end of the links 32 is a sliding member 33 which fits around the leg 31. By sliding the sliding member 33 along the leg 31, it is possible for the leg structure to change between the folded state and the opened state. Moreover, the sliding of the sliding member 33 can be controlled by forming a stopper (not shown in the figure) on the leg 31. In addition, a rubber or plastic cap 35 can be attached to the end of the leg 31 that comes in contact with the ground. Since the leg 31 is a square post, the sliding member 33 does not rotate with respect to the leg 31. Furthermore, since the links 32 maintain the tabletop in a right-angled rectangle in a plane, it is possible to keep rocking of the tabletop to a minimum.

An enlarged pictorial view of the end of a bar 21 is shown in FIG. 4. The bar 21 is the same length as the width of the aforementioned tabletop 10 when opened, and the other end is also shaped the same as that shown in FIG. 4.

The bar is formed in a square pole-shape with rounded corners, and it comprises two grooves 21a which fit with the elastic support pieces 1b of the aforementioned connector 1, and two grooves 21b which fits with the elastic support pieces of the aforementioned connector 2. The bar 21 is made of aluminum, for example, and rubber or plastic caps 22 (see FIG. 1) are attached to the ends.

The method of assembly of the table of this invention is explained based on FIG. 5 and FIG. 6.

First, the links 32 of the leg structure are transformed such that the four legs 31 are standing. There are connectors 2 on the top ends of the legs 31, so that the grooves 21b on the bars 21 are inserted into the elastic support pieces of the connectors 2.

When doing this, since the elastic support pieces are bent in a direction such that the tips face each other, so the bar 21 is inserted by opening the elastic support pieces. Once the bar 21 has been fitted into the connectors 2, it is not easily separated, and is securely fastened so that it does not slide. In addition, since the grooves 21b formed on the bar 21 are formed symmetrically on all four surfaces, so the bar 21 can fit easily in the connectors 2 without paying attention to the direction of the bar 21 faces.

After the two bars 21 have been attached to the leg structure such that they are parallel, the four connectors 1 that are attached to the rear surface of the panels 11 of tabletop are fitted with the grooves 21a on the bars 21 as shown in FIG. 6. to complete assembly of the table.

Figure 7:
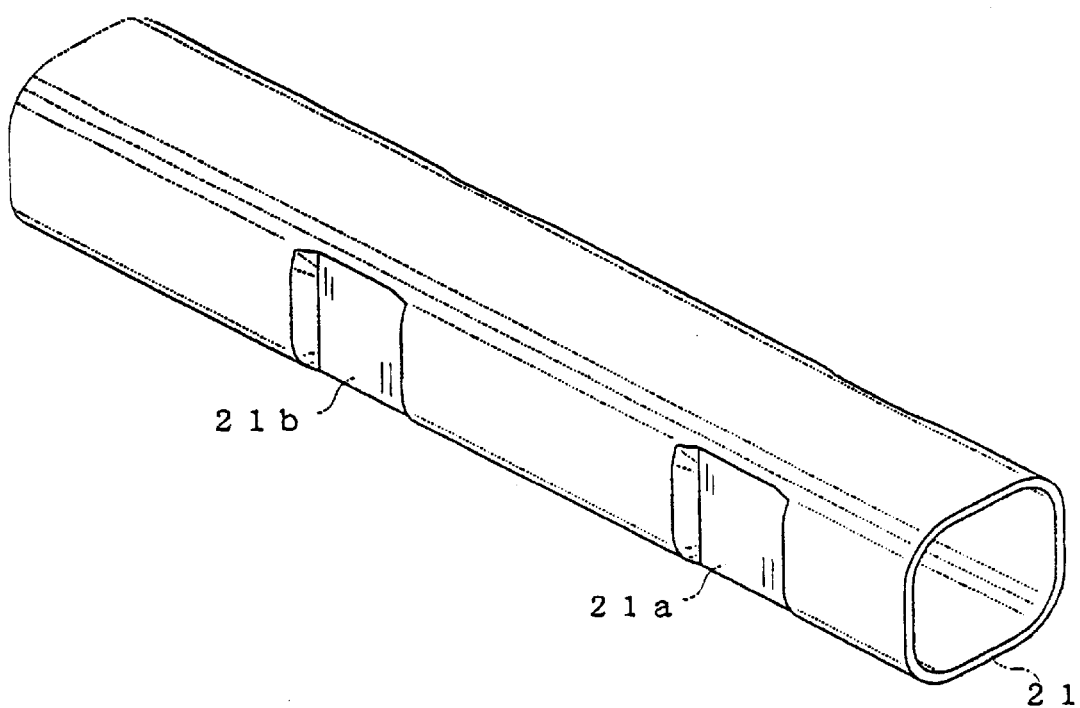
FIG. 7 is an enlarged perspective view of part of the bar of another embodiment of the invention.

An enlarged partial pictorial view of another bar 21 is shown in FIG. 7. This bar differs from that previously described in that the grooves 21a, 21b are formed only on two surfaces. It is also possible to form them on only one surface. The bar 21 of this example is easy to manufacture and can be manufactured at low cost.

Figure 8:
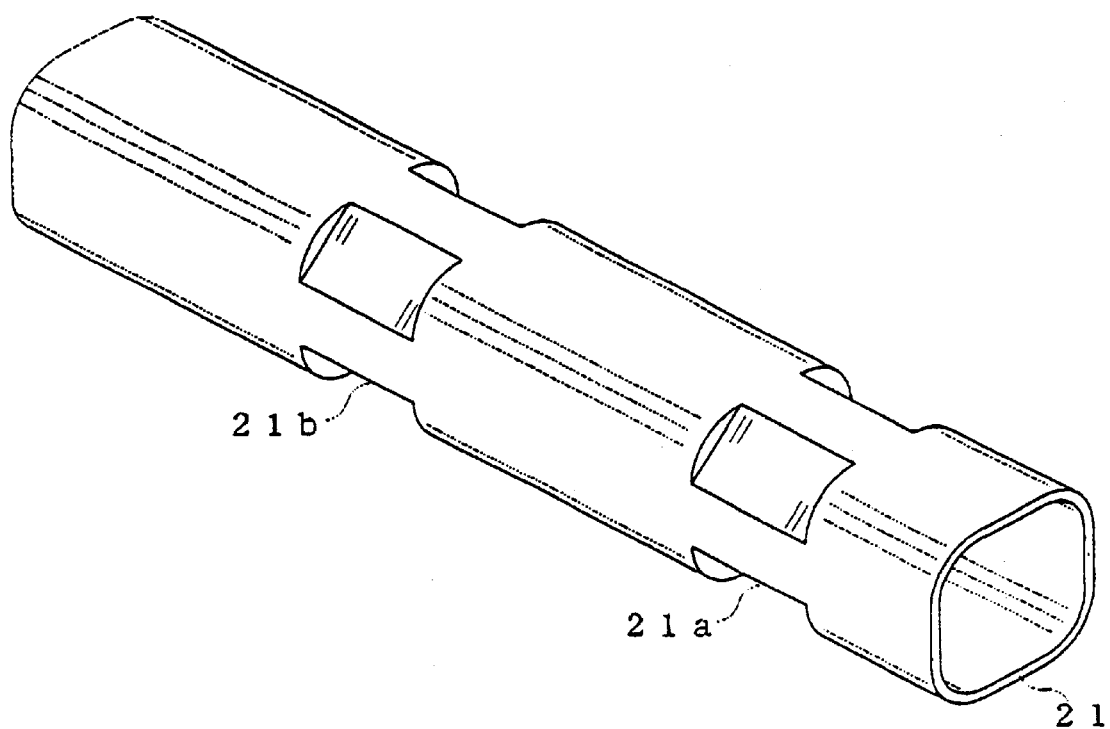
FIG. 8 is an enlarged perspective view of a part of the bar of yet another embodiment of the invention.

Furthermore, FIG. 8 shows an enlarged partial pictorial view of yet another bar 21. The bar of this example differs from that of the previous example in which the surfaces of the bar 21 are depressed. In this example, the corners of the bar 21 are depressed planar to form grooves 21a, 21b. The connectors that fit these grooves are formed such that the shape of their cross-sections match the grooves. The grooves 21a, 21b are flat and oblique with reference to the direction where the bar 21 can be attached to or removed from the connectors, so the elastic support pieces of the connectors transform smoothly and connection is made with no problems.

The bars of these embodiments as shown in the figures are formed in a square pole-shape posts, however they can be round posts, triangular posts or hexagonal posts.

With square pole-shaped bars, it is possible to assemble the table without paying attention to the direction of the bar with respect to the tabletop or leg structure by forming grooves on the bars that correspond to the connectors.

Furthermore, it is possible for the grooves formed on the bars to be hollow sections between two protruding sections. The protruding sections are formed by processing the bar or attaching screws, fittings, etc. thereon.

The present invention is not limited to the examples shown in the figures used for explanation.

With the table of this invention, grooves are formed on square pole-shaped bars such that they can fit from various directions, therefore assembly of the tabletop and the bars, and assembly of the bars and leg structure can be performed easily without trouble.

Moreover, since the legs are formed in a square pole-shape, it is possible to keep the table stable and keep rocking to a minimum.

What is claimed is:

1. A foldable table comprising:
   a tabletop having a first surface and a second surface and a leg structure defined by a plurality of legs having bottom ends and top ends.
   first connectors attached to said second surface of said tabletop and second connectors attached to the top of said plurality of legs, said first and second connectors further comprising elastic supports having inwardly facing tips,
   a plurality of bars attachable to said tabletop and said leg structure, and
   a plurality of grooves positioned on said bars and spaced for engagement with said first and second connectors such that at least portions of said elastic supports fit into said grooves.

2. A foldable table in accordance with claim 1, wherein said tabletop further comprises a plurality of panels connected by rope-type connection means such that said plurality of panels are freely foldable.

3. A foldable table in accordance with claim 2, wherein said plurality of legs are foldable and connected by links.

4. A foldable table in accordance with claim 3, wherein said plurality of grooves further comprises a first set of grooves spaced to engage with said first connectors for attachment of said plurality of bars to said tabletop.

5. A foldable table in accordance with claim 4, wherein said plurality of grooves further comprises a second set of grooves spaced to engage with said second connectors for attachment of said leg structure to said plurality of bars.

6. A foldable table in accordance with claim 5, wherein said first said second sets of grooves are disposed in different locations on said plurality of bars.

7. A foldable table in accordance with claim 6, wherein said plurality of bars further comprises two bars.

8. A foldable table in accordance with claim 7, wherein said plurality of legs further comprises four square, pole-shaped legs, and said second connectors are not rotatable within said second set of grooves when said second connectors are engaged with said second set of grooves.

9. A foldable table comprising:
  a tabletop having a first surface and a second surface and a plurality of foldable legs having bottom ends and top ends.
  first connectors attached to said second surface of said tabletop and second connectors attached to the top ends of said plurality of legs, and
  a plurality of bars attachable to said tabletop and said structure and having first and second sets of grooves,
  wherein said tabletop further comprises a plurality of panels that are connected so that adjacent panels of said plurality are foldable with respect to each other, and
  wherein said first set of grooves are spaced on said bars for engagement with said first connectors, and a second set of grooves are spaced on said bars for engagement with said second connectors.

10. A foldable table in accordance with claim 9, wherein said plurality of panels are connected by rope-type connection means.

11. A foldable table in accordance with claim 9, wherein said plurality of legs are connected by links.

12. A foldable table in accordance with claim 9, wherein said first and second sets of grooves are disposed in different locations on said bars.

13. A foldable table in accordance with claim 9, wherein said plurality of bars further comprises two bars.

14. A foldable table in accordance with claim 9, wherein said plurality of legs further comprises four square, pole-shaped legs, and said second connectors are not rotatable within said second set of grooves when said second connectors are engaged with said second set of grooves.

* * * * *